(12) United States Patent
Fung et al.

(10) Patent No.: US 7,029,273 B2
(45) Date of Patent: *Apr. 18, 2006

(54) PROCESS FOR CARBONIZING WOOD RESIDUES AND PRODUCING ACTIVATED CARBON

(75) Inventors: Paul Y. H. Fung, Ormond (AU); Adrian I De Vos, Springvale (AU); Velauthapillai Muruganathan, Vermont South (AU); Hoc S Ng, Doncaster (AU)

(73) Assignee: Commonwealth Scientific and Industrial Research Organization, Canberra (AU)

( * ) Notice: Subject to any disclaimer, the term of this patent is extended or adjusted under 35 U.S.C. 154(b) by 0 days.

This patent is subject to a terminal disclaimer.

(21) Appl. No.: 10/933,312

(22) Filed: Sep. 3, 2004

(65) Prior Publication Data

US 2005/0072343 A1    Apr. 7, 2005

Related U.S. Application Data

(63) Continuation of application No. 09/959,608, filed as application No. PCT/AU00/00410 on May 4, 2000, now Pat. No. 6,808,390.

(30) Foreign Application Priority Data

May 4, 1999  (AU) ................... PQ0159
Jun. 1, 1999  (AU) ................... PQ0679

(51) Int. Cl.
*F27B 15/00*  (2006.01)

(52) U.S. Cl. ............... 432/14; 432/15; 110/245

(58) Field of Classification Search ........... 432/14, 432/15, 58; 110/245; 201/4, 12, 25, 31; 422/142, 145, 146
See application file for complete search history.

(56) References Cited

U.S. PATENT DOCUMENTS

| 4,288,628 A | 9/1981 | Shim |
| 4,409,416 A | 10/1983 | Snell et al. |
| 4,510,021 A | 4/1985 | Sowards |
| 4,546,111 A | 10/1985 | Banquay |
| 4,669,395 A | 6/1987 | Brannstrom |
| 4,740,216 A | 4/1988 | Allard |
| 4,757,771 A | 7/1988 | Narisoko et al. |
| 4,898,533 A | 2/1990 | Okamoto et al. |
| 4,968,325 A | 11/1990 | Black et al. |
| 5,101,742 A | 4/1992 | Sowards et al. |
| 5,293,843 A | 3/1994 | Provol et al. |

(Continued)

FOREIGN PATENT DOCUMENTS

DE   3614901 A1   5/1987

(Continued)

OTHER PUBLICATIONS

Derwent Abstract Accession No. 3067X/17, J01, J5 1027 892 A (Showa Denko KK) Mar. 9, 1975.

(Continued)

*Primary Examiner*—Jiping Lu
(74) *Attorney, Agent, or Firm*—Pillsbury Winthrop Shaw Pittman, LLP

(57) ABSTRACT

An apparatus and process for preparing activated carbon from a wood or wood residue feedstock using fluidized bed technology. The fluidized bed apparatus has a number of wood residue inlets that allow differing residence times in the fluidized bed apparatus appropriate for the wood or wood residue feedstock to be carbonized. The carbonized material may then be activated to form activated carbon.

3 Claims, 2 Drawing Sheets

U.S. PATENT DOCUMENTS 5,395,606 A 3/1995 Xiao et al.
6,669,822 B1 * 12/2003 Fujimura et al. ............. 201/37
6,808,390 B1 * 10/2004 Fung ........................... 432/14

FOREIGN PATENT DOCUMENTS

JP 1027-892 3/1975
JP 3022-896 3/1978

OTHER PUBLICATIONS

Derwent Abstract Accession No. 27945A/15, J01, J5 3022 896 A (Santo Tekko KK) Mar. 2, 1978.

* cited by examiner

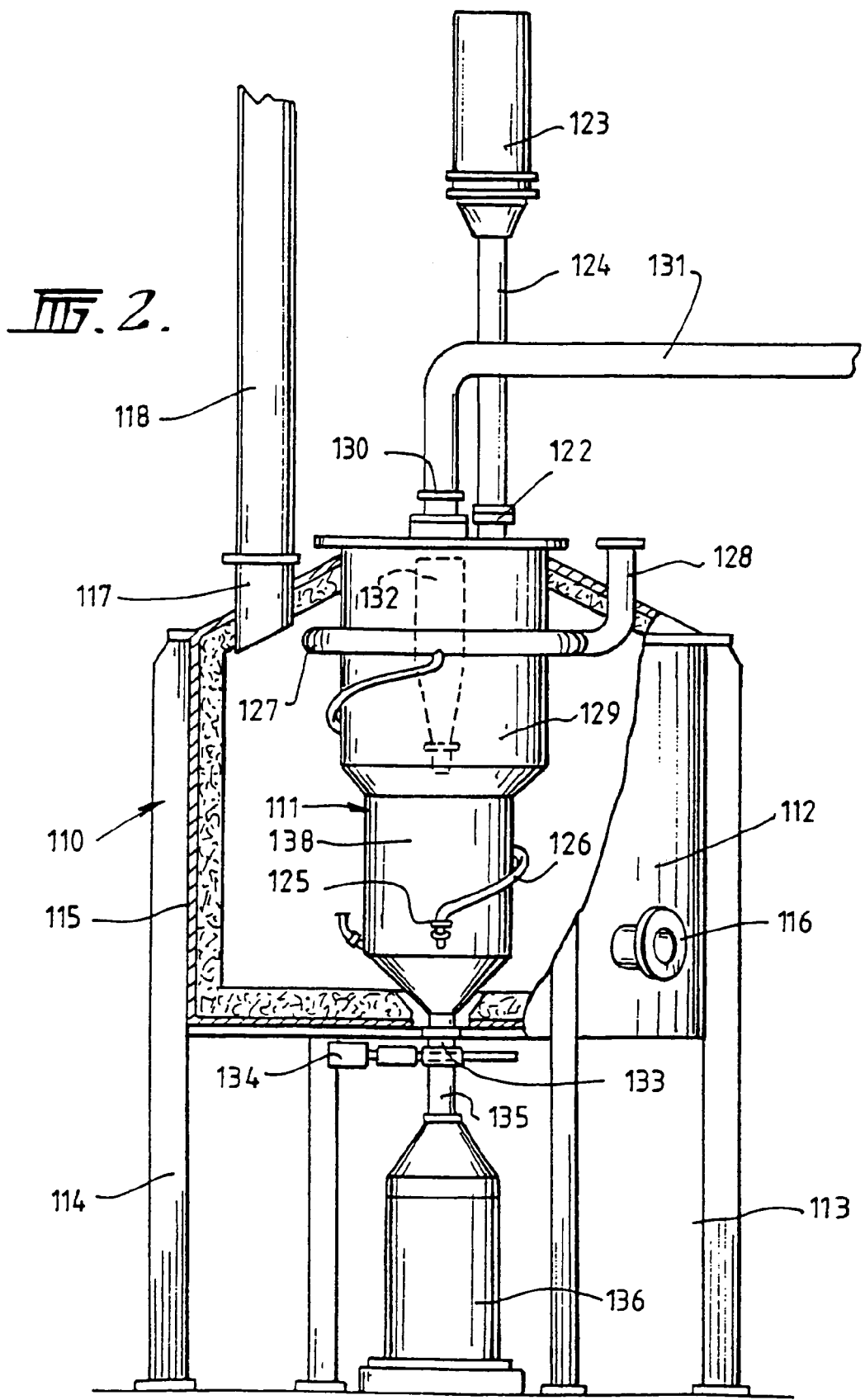

PROCESS FOR CARBONIZING WOOD RESIDUES AND PRODUCING ACTIVATED CARBON

This application is a continuation of U.S. application Ser. No. 09/959,608, filed Feb. 4, 2002, now U.S. Pat. No. 6,808,390 which is based on PCT Application No. PCT/AU00/00410, filed May 4, 2000, which claims priority to Australian Application No. PQ 0159, filed May 4, 1999 and Australian Application No. PQ 0679, filed Jun. 1, 1999.

TECHNICAL FIELD

The present invention relates to a fluidized bed apparatus and a process for carbonizing wood and/or wood residues, especially in a fluidized bed apparatus. The invention also relates to a process and an apparatus for the production of activated carbon.

BACKGROUND TO THE INVENTION

The timber industry generates considerable quantities of wood residues. Bark is produced in the debarking of the logs. Sawing of the debarked logs produces slabs, edgings and sawdust. If the solid slab and edgings are chipped for export pulp chips, the chips must be screened and this produces additional residues in the form of undersized and oversized woodchips. The timber is often seasoned then dressed and docked to length before despatching to the markets. This produces dockings and planer shavings residues. In many circumstances, there is poor utilization of the wood residues. Some of the bark can fetch a market as a garden mulch if it is sized. Sawdust, chip fines and planer shavings are used by the mill for energy, in most cases, as a fuel for kiln drying timber and, in a small number of mills, for electricity generation. However, there are generally many more residues produced than the energy requirements of the sawmilling industry. Sawdust is also used for composting into garden potting mixes. Generally, there is a large surplus of residues as the markets for horticulture are diminishing as demand for the dark *P.radiata* bark has fallen as the lighter wood fibre product has gained in popularity. The use of chipped prunings is also increasing as Councils and householders are turning to recycling and self-sufficiency. Where the residues are not utilised, they must be disposed of by incineration and land-fill dumpimg. The disposal of wood residues not only puts a severe cost on the sawmilling operation, particularly with the pollution restrictions imposed on air quality, water effluent into water-ways and ground water and the diminishing land-fill availability, but it represents a loss of a potentially valuable wood resource. Unlike coal which can be left in the ground to mine at a later date, wood residues cannot be stored on a long term basis and need to be processed when produced. Wood residues are also bulky, as in the case of sawdust and shavings, and can also contain a considerable quantity of water. Processing or utilization in-situ offers the advantage of avoiding the high cost of transportation.

When wood is heated, it loses free and hygroscopic water after which it will carbonize at temperatures in excess of 270° C. Gas and vapours are produced during carbonisation which, at some stage, becomes exothermic. There are many complex reactions occurring at the same time in the thermal decomposition of the various chemical components of wood. Practical carbonizing temperatures are in the range of 400–700° C. in order to produce charcoal with low-volatile content without excessive shortening of equipment life.

The volatile products consist of combustible gases and vapors. The energy value of the volatile products represents some 50% of the gross calorific value of the original dry wood. Although there are significant proportions of valuable chemical compounds present in the volatile products, production on a larger scale is required to economically justify the fractionation and recovery of these compounds. However, the typical scale of operations in individual timber mills cannot produce economic quantities of volatile products. This material can present problems in handling due to its acidic, corrosive nature and it would be a serious pollutant if discharged into the environment. One way of handling the volatile products is to burn them as they are produced before they are able to condense. The waste heat can be recovered to supply the energy requirements of the industry, hence optimizing the thermal efficiency of the carbonization process.

A viable system for the sawmilling industry would perform the threefold purpose of disposal of the wood residues, supply the energy requirements of the milling and seasoning operations; and upgrade the excess material into a product which can provide a profitable return.

The applicant's earlier Australian Patent No. 547130 described a process that achieved the above aims. This earlier patent described a process for carbonizing wood by feeding wood into a fluidized sand bed preheated to a temperature above the carbonizing temperature. The fluidized bed was fluidized with a gas mixture that included an oxidizing gas. The reaction conditions within the bed was selected such that all or a major proportion of the volatile components of the wood were burnt during carbonization, either as the volatiles were produced in the bed or partially burnt in the bed and the remainder in an afterburner. The burning of the volatile components provided sufficient energy to supply the heat required by the process as well as provide an excess of heat. Charcoal produced by the process was recovered as product.

The process described in Australian Patent No. 547130 provides a satisfactory process for treating timber milling residues to obtain a value-added product.

The present inventors have now developed an improved process for carbonizing wood, such as timber milling residues.

Activated carbon is an amorphous form of carbon having a very high specific surface area. Activated carbon has high absorptivity for a large number of substances and is widely used as an adsorbent in many industries, including water treatment, sugar refining, gold mining, brewing, gas adsorption and air conditioning, to name but a few. Activated carbon may be obtained by the destructive distillation of wood, nut shells, animal bones or other carbonaceous materials. It is also possible to produce activated carbon by activating a carbon feedstock, such as charcoal. Activation occurs by heating the material to be activated to an elevated temperature, such as 800–900° C. with steam or carbon dioxide to produce a carbon material having high porosity and a specific surface area that may be in excess of 1000 $m^2/g$.

SUMMARY OF THE INVENTION

According to a first aspect, the present invention provides a process for carbonizing wood residues to produce charcoal, said wood residues including wood or woody-type particles of varying size and/or moisture content, the process including the steps of feeding the wood residue to a fluidized bed having a plurality of wood residue inlets, the wood or woody-type particles of varying size and/or dryness being fed to differing ones of the plurality of wood residue inlets according to an expected time for carbonization for said wood or woody-type particles, the fluidized bed including a bed of inert particulate material fluidized with or having injected therein a gas or gas mixture containing an oxidizing gas, carbonizing the wood residues in the fluidized bed under reaction conditions selected such that volatile components in the wood residues are removed during carbonization and are burned in or above the bed or in an afterburner to thereby supply the heat requirements for carbonization and separating charcoal from the inert particulate material.

Preferably, the residence time of a wood or woody-type particles in the fluidized bed is largely determined by the wood residue inlet through which the wood or woody-type particle is fed to the bed. In this manner, different residence times in the bed for different particles may be obtained by feeding the particles through different wood residue inlets.

The process may preferably further include grading the wood or woody-type particles into a plurality of grades according to expected time for carbonization and feeding different grades to different of the plurality of wood residue inlets. The plurality of grades may include grades based upon particle size, moisture content, wood species and type of residue, for example, wood or bark. The wood or woody-type particles may include sawdust, planer shavings, shredded dockings, woodchips, bark, barkchips and larger wood such as blockwood.

According to a second aspect the present invention provides a process for production of activated carbon from a carbon feedstock including the steps of providing a fluidised bed reactor, adding particulate material to the fluidised bed reactor to form a bed of particulate material, adding the carbon feedstock to the fluidised bed reactor, fluidising the bed and activating the carbon feedstock to produce activated carbon and recovering activated carbon from the bed.

Preferably the carbon feedstock is the product of the first aspect of the present invention.

Preferably, the step of activating the carbon feedstock includes adding steam to the fluidised bed. More preferably, steam is used as the fluidising gas in the fluidised bed. The steam is most preferably superheated steam. Activating gases other than steam may be used. Another suitable activating gas is carbon dioxide.

According to a third aspect the present invention provides an apparatus for carbonizing wood residues to produce charcoal including a fluidized bed reactor having a plurality of wood residue inlets for supplying wood residues thereto, a discharge outlet for removing fluidized bed contents from the fluidized bed and at least one fluidizing gas inlet, characterized in that residence time of a wood or woody type particle in the fluidized bed reactor is dependent upon the inlet through which the wood or woody type particle is fed to the fluidized bed reactor.

The apparatus may further include separating means for separating charcoal from the fluidized bed contents removed from the discharge outlet and return means for returning inert particulate material to the fluidized bed reactor. The return means may comprise a conduit connected to an inlet. This inlet may be one or more of tire wood residue inlets. The conduit may be provided with particulate material transport means, which may be a conveyor, a screw conveyor, an augur, pneumatic conveying means or gaseous conveying means.

The separating means may comprise a screen means, especially a vibratory screen means.

The fluidized bed reactor should also include an exhaust gas outlet for removing fluidizing gas and combustion gas from the fluidized bed reactor. A gas-solid separation means may be provided to separate elutriated solids from the exhaust gas. The gas-solid separation means may be a cyclone or an electrostatic precipitator.

The apparatus may further include an afterburner for burning any uncombusted volatiles in the exhaust gas. A pre-heater for heating the fluidized bed reactor may also be provided to pre-heat the fluidized bed at start-up or during low temperature operation.

The apparatus may also include heat recovery means for recovering heat from the fluidized bed in the reactor. Heat recovery means may also be provided for recovering heat from the exhaust gas and/or the afterburner.

According to a fourth aspect the present invention provides an apparatus for producing activated carbon including a furnace, a reactor positioned inside the furnace, the reactor including solids inlet means for supplying solids to the reactor and gas inlet means for supplying gas to the reactor, at least one pipe connected to the gas inlet means of the reactor, said at least one pipe having at least a portion of its length extending within the furnace whereby gas flowing through said at least one pipe to the reactor is heated to an elevated temperature by the furnace.

Preferably, the reactor is a fluidized bed reactor.

Preferably, that at least one pipe has a substantial portion of its length extending within the furnace. Preferably, that at least one pipe is positioned within the furnace and external to the reactor.

Preferably, the apparatus further includes a gas manifold inside the furnace, the gas manifold having an inlet and a plurality of outlets, each of the plurality of manifold outlets having respective ones of a plurality of pipes extending therefrom, the plurality of pipes being connected at their other ends to the gas inlet means of the reactor.

Preferably, the gas manifold is positioned external to the reactor. Preferably, the gas manifold extends substantially around the reactor. Preferably, the gas manifold is positioned at an upper part of the furnace.

Preferably, the gas inlet means of the reactor is a fluidizing gas inlet means of a fluidized bed reactor. Preferably, the gas inlet means of the reactor comprises a plurality of gas ports. The gas ports are connected to respective ones of the plurality of pipes.

The furnace may include at least one burner.

The reactor may include exhaust gas removal means for removing exhaust gas therefrom. The exhaust gas removal means may include solids removal means for removing solids from the exhaust gas. The solids removal means may comprise a screen, a filter or a cyclone. The solids removal means may return removed solids to the reactor.

The reactor may also include solids outlet means for removing solids from the reactor. However, the reactor may be configured such that solids removal may take place via the solids inlet means. It may also be configured such that solids removal may take place by elutriation through the exhaust gas outlet.

In use of apparatus of the present invention is used to produce activated carbon, calcined alumina and feedstock carbon are supplied to the reactor. As the reactor is inside the furnace, the furnace heats the contents of the reactor to the desired activation temperature. Fluidizing gas, in this case steam, is supplied to the gas inlet of the reactor via at least one pipe extending within the furnace. As the steam flows through the at least one pipe it is superheated to the desired temperature by the furnace. As the steam enters the gas inlet of the reactor, it is at the desired temperature and activation of the carbon feedstock proceeds.

Although the apparatus of the present invention has been described as being used for production of activated carbon, it will be appreciated that the apparatus may be used in any process where it is desired to pass a gas at elevated temperature through a bed of solids material.

DETAILED DESCRIPTION OF THE INVENTION

The inert particulate material may comprise any suitable particulate material that is able to be fluidized and does not undergo substantial reaction in the operating conditions experienced in the fluidized bed. Sand is a suitable particulate material for use in the present invention. Fine sand is preferred over coarse sand because fine sand gives better heat transfer to submerged surfaces (such as a heat exchanger within the bed) and to cold feed particles of wood residues and promotes better combustion of volatile gases within the bed. Fine sand also causes less attrition of submerged surfaces and products then coarse sand. Ilmenite sand has been found to be particularly suitable because it has a fine size (typically below 1 mm), is very dense, wear resistant and has a high melting point. Thus, it can be used over a wide range of operating conditions. Ilmenite sand is a naturally occurring, relatively abundant, low cost material.

Calcined alumina may also be used as a suitable particulate material in the present invention.

The reaction conditions used in the fluidized bed are those that are suitable for carbonizing wood residues. The temperature may range from 250° C. to about 1000° C., preferably 250° C. to 700° C., more preferably with a temperature range of 400–600° C., most preferably at about 500° C., being suitable for optimum charcoal production.

The present invention is based on the rapid drying and pyrolysis of residue particles in a fluidized bed which has a high rate of heat transfer between hot particulate material and wood particles. The volatile products of carbonization produced within the fluidized bed are combusted on encountering oxygen. The volatiles burn rapidly, producing heat while the charcoal formed burns more slowly. The charcoal product is recovered from the fluidized bed by separation and cooling before it has time to burn to a significant extent.

By maintaining an excess of oxygen in the bed, charcoal production is controlled by the kinetics of the combustion of the charcoal and volatiles. At lower bed temperatures, typically 400° C.–500° C., the rate of combustion of charcoal is slow and recovery of charcoal can be high. At high temperatures above 600° C., charcoal can burn rapidly and result in complete combustion. If bed temperatures are too low, such as 400° C. or lower, the rate of combustion of volatiles can become too slow to maintain the heating of the bed and much of the volatiles can escape the bed without burning. When this occurs, supplementary preheating of the bed may be necessary and if the preheat burners can not burn the volatiles escaping from the bed, an afterburner may also be required to eliminate the discharge of unburnt volatiles.

Heat can be recovered from the combusted off-gases by using a heat exchanger. It is also possible to recover heat from the bed with a heat exchanger submerged in the fluid bed. This has the advantage of utilizing the high heat transfer coefficients within the bed. In addition, by removing the heat from the bed, it is possible to increase the carbonizing capacity of the bed.

Another feature of the present invention is that the operating conditions can be altered to meet varying requirements for either charcoal production or heat production only. This is an especially useful feature where the carbonization process forms part of an integrated saw mill. Such integrated saw mills typically have drying kilns associated therewith for drying sawn timber.

It has been found that by operating a fluid bed fluidized with air at bed temperatures above 650° C., rapid combustion occurs for sawdust and woodchips. Efficient, total combustion occurs above 700° C. Maximum heat recovery can be derived from this system through heat exchangers within the bed and/or in the combustion off-gases. If the fluid bed temperature was reduced, the charcoal formed as an intermediate phase burns more slowly and can be recovered as a byproduct. It was found that at a bed temperature around 500° C., good recovery of charcoal can be achieved with complete combustion of volatile products of carbonization within the fluidized bed. (Carbonization, pyrolysis, or thermal decomposition occurs when wood is heated above 250° C. The hemicellulose component of wood decomposes at the low temperature to produce a charred wood). The bed temperature can be regulated by controlling the feedrate of wood fuel. Within the design capacity of the system, a high feedrate of fuel will increase combustion temperature within the fluid bed and vice versa.

This system can be used as a boiler or process heat production unit with a high turndown ratio exceeding that of conventional combustion systems by lowering the combustion temperature to a theoretical limit of 250° C. to produce a byproduct charred wood. In practice however, the bed temperature should be around 500° C. but can be lowered if the volatile gases which escapes the bed is burnt in an afterburner, or secondary combustion chamber and enough of this heat transferred to the fluidized bed to sustain the carbonization temperature. At 500° C., the charcoal product has a higher fixed carbon content than low temperature chars.

The system becomes a very flexible system for sawmills which can use the process heat for kiln drying of its sawn products. During the heatup cycle of the kiln and charge, the heat demand is at its maximum. Under this situation, the fluid bed unit can produce its maximum heat output by operating at a high bed temperature for complete combustion and the maximum design feedrate of wood fuel. As the timber charge is kiln dried at mid cycle, the heat demand drops to a low level. Here, the fluid bed can operate in its charcoal producing mode to reduce heat output and maximize charcoal production. Wood residue production in typical sawmills far exceeds its energy requirements. In energy terms, only 20% of the total residue production can provide all the energy requirements. Some of this excess energy can be converted into a saleable charcoal byproduct. The system can therefore be tailored to process the residue production and provide the energy needs to sawmills.

Charcoal is one of the products of the present invention.

Product charcoal is separated from the inert particulate material in the fluidized bed and recovered. Product charcoal may be separated from the inert particulate material in two ways:

i) at least a portion of the contents of the fluidized bed are removed from the bed and the charcoal separated from the inert particulate material, for example, by sieving or screening. The charcoal is recovered as product and the inert particulate material is recycled back to the fluidized bed, preferably whilst still hot. Preferably, at least a portion of bed contents is continuously removed and the separated inert particulate material is continuously recycled to the bed. This method of separation is limited by the particle size of inert particulate material as the screen size must be larger than the particle size of the sand.

ii) charcoal fines may be separated and recovered by elutriation from the bed. The upward velocity of the fluidizing gas and combustion eases will lift out particles of a size that their terminal velocity is less than the upward velocity of the gases. The wood-derived charcoal particles have a low particle density. To maximize the degree of charcoal fines elutriation, the inert particulate material preferably has a high particle density. Further-more, fluidization velocities are preferably below a velocity that would carry off particles of the inert particle material. With bed attrition, breakdown of the inert particulate material could see the fines caused by such breakdown reporting in the charcoal fines product.

It will be appreciated that the present invention also extends to cover any other suitable process for recovering charcoal from the fluidized bed.

The fluidizing gas used in the present invention is preferably air. The supply of fluidizing air should preferably be such to ensure adequate excess of oxygen for the combustion of volatiles within the bed. The maximum flowrate that may be used is that which can just promote the mixing of the inert particulate material and the wood residues. Operating below this regime may result in bed segregation occurring.

The fluidized bed is preferably able to be sectioned off so that the superficial velocity can be adjusted to optimize each section. By turning off fluidizing gas to a particular section, the bed in that section will be slumped or immobilized.

The fluidized bed is preferably configured as a linear slide fluidized bed with multiple feed injection points along the bed. In this arrangement, the positioning of the multiple feed injection points corresponds to the required residence times to carbonize the grade of wood residue passing through each of the wood residue inlets or injection points. To make the unit shorter, a unit with internal walls in the fluidized bed section to channel the material in a spiral fashion from inlet to outlet may be used.

If required to promote better mixing of wood residues and the inert particulate material, one or more mechanical stirrers may be introduced.

The fluidized bed may have a single discharge point. The fluidized bed may be provided with a recycled particulate material inlet for returning recycled inert particulate material to the bed. Alternatively, the recycled inert particulate material may be returned to the bed via one or more of the wood residue inlets.

In the second aspect of the present invention the carbon feedstock may be charcoal, such as charcoal produced from saw milling and other wood residues such as bark, wood chips and saw dust. The charcoal is suitably produced by the process described in the applicant's Australian Patent No. 547,130. However, especially preferred is the charcoal as produced according to the process of the present invention. Other carbon feedstocks may also be used. Other suitable carbon feedstocks include coke and chars based on various carbonaceous sources such as biomass, nut shell, fruit seed, fruit kernel, animal, peat, brown coal, coal, anthracite, petroleum, natural gas or other organic compounds and substances. Straight carbonaceous materials of the above-mentioned feedstocks can also be used as the process could convert these to an intermediate char stage.

The temperature during the activation step is preferably within the range of 650–1000° C., more preferably within the range of 800–900° C., most preferably within the range of 800–850° C.

The time required to complete the activation step preferably falls within the range of 10 minutes to 3 hours.

The particulate material is preferably calcined alumina although any other particulate material that is stable at the temperatures encountered during the process and does not deleteriously react with the feedstock carbon or the activated carbon may also be used. Sand is an example of another suitable particulate material that may be used in the process. The particulate material ideally should not break up or wear down during fluidisation not melt nor soften under the high temperature process conditions.

A particle size analysis of a calcined alumina suitable for use in the present invention is as follows:

| | |
|---|---|
| +212 microns | less than 1% |
| −212 + 106 microns | 40–60% |
| −106 + 45 microns | 53–60% |
| −45 microns | 0–5% |

In cases where steam is used as the activating gas, one of the by products of the process is water gas. In such cases, the process preferably further comprises recovering the water gas and using the water gas to provide the heating or energy requirements of the activating process. If there is a surplus of water gas, the surplus gas can be reticulated as a fuel gas and/or used to generate electricity that may be utilised on-site or sold to the electricity supply grid.

Waste heat from the process may be used to generate steam to supply the process steam requirements.

The process of the present invention may be a continuous process or a batch process. If the process is to be used to produce activated carbon from charcoal obtained from wood residues, the process is preferably operated at the wood processing site (such as a saw mill or a wood chipping plant). As the size and quality of the carbon feedstock may vary widely in this situation, a batch process is preferred in order to provide greater flexibility during operation. For example, residence times are much easier to alter in a batch process because it is simply a matter of changing the batch time.

If steam activation is used and the by-product water gas is recovered for energy requirements, it is preferred that a plurality of fluidized bed reactors are used in order to even out the production of water gas and to ensure that water gas is constantly available. For example, if two fluidized bed reactors are used, one may be activating charcoal and producing water gas whilst the other is being emptied and re-charged.

As mentioned above, calcined alumina may be used as the particulate material in the bed. Calcined alumina has a relatively low density and small particle size and this enables a deeper bed to be used for a given pressure drop, when compared to denser and coarser bed materials such as sand. Alternatively, a lower bed weight can be obtained which allows a lower strength reactor to be used. This may be an important factor to consider because the reactor is operated at elevated temperatures. Moreover, calcined alumina is white in colour and provides a visual contrast to the black-coloured activated carbon. This allows a visual inspection to determine if adequate separation of the product from the particulate material is being obtained.

The product activated carbon may be recovered by separating it from the particulate material by any suitable method known to the person skilled in the art. The activated carbon is suitably removed from the solid material by sieving. In a continuous process, the activated carbon may be recovered by periodically removing a portion of the solid material from the bed and separating the actuated carbon therefrom. Alternatively, the activated carbon may be elutriated by the exhaust gas and recovered therefrom. In batch processes, the entire solids load of the batch may be removed from the fluidized bed reactor and the activated carbon subsequently removed therefrom. The hot bed material can be re-used for the next carbon activation batch in the hot state to conserve heat energy.

The present invention also relates to an apparatus for producing activated carbon.

A preferred embodiment of the present invention will now be described with reference to FIG. 1. It will be appreciated that the following description is intended to be illustrative of an embodiment the present invention and should not be considered to limit the present invention to the embodiment described.

BRIEF DESCRIPTION OF THE DRAWINGS

FIG. 2 is a schematic drawing of an apparatus according to a second aspect of the present invention.

FIG. 1 an apparatus is shown in accordance with the present invention, which is used for carbonizing wood residues in accordance with the process of the present invention. The apparatus includes a fluidized bed reactor 10 which contains a fluidized bed, generally indicated by reference numeral 12. The fluidized bed 12 includes particulate material, in this case fine ilmenite sand. The fluidized bed arrangement shown in FIG. 1 is a linear slide fluidized bed in which the material in the bed is gradually moved from an inlet end 12a to an outlet end 12b.

Figure 1:
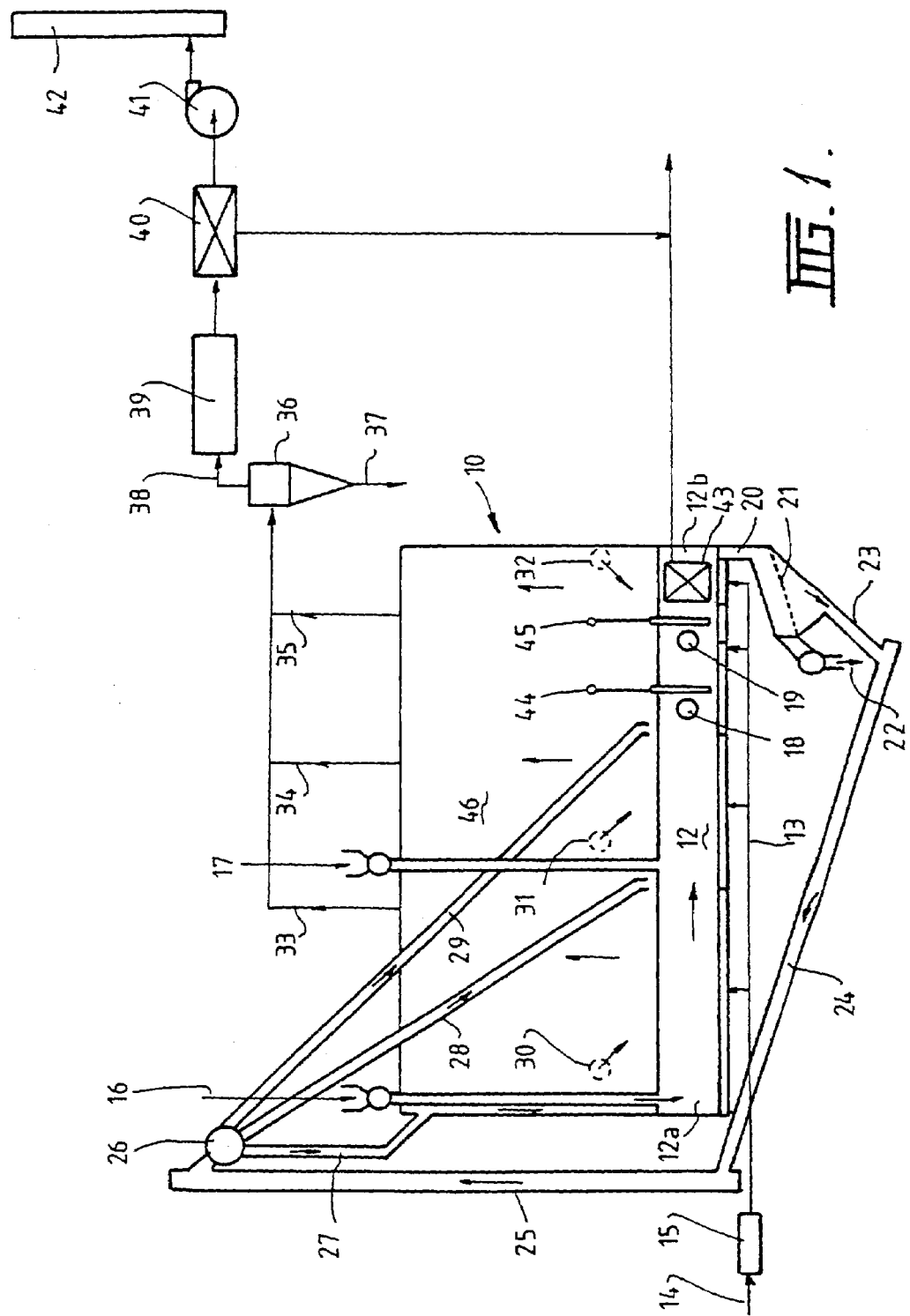
FIG. 1 is a schematic drawing of an apparatus according to one aspect of the present invention.

The fluidized bed reactor 10 includes an air distributor 13 located below the fluidized bed of sand 12. Ambient air 14 passes through an air preheater 15 to air distributor 13 and thereafter the fluidizing air passes upwardly through the fluidized bed reactor 10.

The fluidized bed reactor 10 is provided with a plurality of feed injection points 16, 17, 18, 19. Feed injection points 16, 17, 18, 19 are used for feeding wood residues of differing grades into the fluidized bed 12. Due to the arrangement of fluidized bed 12 as a linear slide fluidized bed, one factor controlling the residence time of material in the bed is the position at which the material is injected into the bed. In particular, the further from outlet end 12b material is injected, the longer the residence time of that material in the bed. Therefore, if it is desirable or necessary to treat a feed stock of wood residues that comprises wood particles or woody particles of differing size, moisture content and composition, such that the wood particles or woody type particles require different times for complete carbonization, it is possible to grade the wood residues into different grades of material depending upon their carbonization times and inject the different grades through the appropriate feed injection point. For example, it has been found that dry shavings are fully carbonized very quickly. Sawdust and shredded dockings take slightly longer to carbonize than dry shavings. Woodchips take longer again and bark chips require an even longer time for carbonization to occur. Accordingly, the wood residues could be graded or classified into shavings, sawdust and shredded dockings, woodchips and bark chips. The bark chips would be fed to the fluidized bed through feed injection point 16. The wood chips would be fed to the fluidized bed through feed injection point 17. Sawdust and shredded dockings would be fed to the fluidized bed through feed injection point 18 and dry shavings will be fed to the fluidized bed through feed injection point 19.

The fluidized bed reactor includes an outlet 20 at outlet end 12b. During operation of the apparatus shown in FIG. 1, the contents of the fluidized bed are continuously removed through outlet 20. It will be appreciated that the fluidized bed contents removed through outlet 20 comprise a mixture of sand and charcoal. The fluidized bed contents fall onto a vibrating screen 21 where oversize lump charcoal is separated from the sand, which passes through the screen 21. The lump charcoal slides downwardly from the screen through product outlet 22 where it is recovered. The sand that passes through screen 21 travels through conduit 23 and upwardly along conduits 24 and 25 to a distribution valve 26 that controls the recycle of sand to the fluidized bed. It will be appreciated that the sand that is recycled from screen 21 is preferably returned to the fluidized bed reactor whilst it is still hot. This has obvious implications for the energy efficiency of the process. In order to ensure that the sand passes upwardly through conduits 24 and 25, these conduits may be provided with suitable solid transport means, such as a conveyor, an auger or pneumatic conveying apparatus. Distribution valve 26 regulates the position at which the recycled sand is returned to the fluidized bed. In particular, the recycled sand may be returned to the fluidized bed through conduit 27, conduit 28 or conduit 29.

The fluidized bed reactor also includes preheaters 30, 31 and 32, which may each comprise a gas burner. Preheaters 30, 31, 32 act to preheat the sand in the fluidized bed to the desired operating temperature during startup. The preheaters 30, 31, 32 also act to provide supplementary heating to the fluidized bed if only small quantities of wood residues are being fed to the fluidized bed or if large quantities of heat are being extracted from the fluidized bed.

When wood residues are fed to the fluidized bed 12 through one or more of multiple injection points 16, 17, 18, 19, the wood residues are rapidly dried and pyrolised. The fluidized sand bed 12 provides a high rate of heat transfer between the hot sand and the wood residue particles. The volatile products of carbonization or pyrolysis produced within the fluidized bed are combusted on encountering oxygen from the air used to fluidize the bed. The volatiles burn rapidly, producing heat while the charcoal formed burns more slowly. The charcoal product is recovered from the fluidized bed by separation and cooling before it has time to significantly burn.

At the operating conditions used in fluidized bed reactor 10 for the production of charcoal, which conditions include an operating temperature of approximately 500° C., it has been found that sawdust particles fed to the fluidized bed reactor 10 require up to 2 minutes to carbonize, depending on species and moisture content. Wood chips require up to 4 minutes. As drying requires a significant time, high moisture content feedstocks will take longer to carbonize. Dry shavings have been found to be fully carbonized within 1 minute as compared with 2 minutes for green sawdust. Dry, shredded dockings took 2 minutes to fully carbonize, compared with 4 minutes for wood chips from the same species. Bark has been found to require longer residence time to carbonize than wood, typically requiring 6 minutes.

As mentioned earlier, the volatile components driven off the wood residues during carbonization are burned in the fluidized bed reactor 10. The exhaust gas leaves fluidized bed reactor 10 through exhaust gas outlets 33, 34, 35. The exhaust gas comprises a mixture of fluidizing gas and combustion products. The exhaust gas may also include some uncombusted volatiles. Fine charcoal particles are elutriated with the exhaust gas, as are any very small particles of sand that have been formed by attrition or abrasion in the fluidized bed. In order to remove the solid particles from the exhaust gas and to recover the fine charcoal particles therefrom as product, the exhaust gas passes through a cyclone 36. The fine solids material elutriated with the exhaust gas is separated from the exhaust gas inside claim 36 and the solids are recovered at an underflow 37 from the cyclone. Cleaned gas 38 leaves the cyclone. The exhaust gas line may be provided with an afterburner 39 to fully combust any remaining volatile compounds in the exhaust gas. A heat exchanger 40 is provided in the exhaust gas line to recover heat from the exhaust gas. The exhaust gas leaving heat exchanger 40 thereafter passes through blower or fan 41 to stack or flue 42.

Significant quantities of heat are also generated by combustion of volatiles in the fluidized bed reactor 10. In order to recover this heat, the fluidized bed reactor 10 is provided with a heat exchanger 43, which heat exchanger suitably includes heating coils immersed within fluidized bed 12.

In the event that the fluidization of the gas does not provide sufficient mixing, the fluidized bed 12 may also be provided with mechanical stirrers 44, 45.

The fluidized bed arrangement shown in FIG. 1 includes a channel for large sized wood residues, such as wood chips, where the fluidized bed transports the wood residue feedstock from the feed entry points to the discharge end during which time the material dries and carbonises. The bed material then falls onto a screen, especially a vibrating screen, to recover course charcoal product from the hot sand. The sand is conveyed back to the feed end to effect the bed circulation. The length of the channel section and circulation rate of the sand are designed according to the desired residence time of the wood residue particle. For a given length of channel section, the residence time can be controlled by the sand circulation rate.

A disengagement space 46 above the bed allows the particles thrown upwards by the gas bubble eruptions at the surface of the fluidized bed 12 to fall back without entrainment in the exhaust gas.

The fluidized bed reactor 10 is conveniently operated under a slight negative pressure. This can be achieved by an induced draft fan 41 at the flue-gas discharge. Air locks (not shown) such as the rotary type, at the various feed entry points and product discharges maintain the negative pressure.

Coarse residues such as bark and woodchips can be fed by dropping them onto the bed from above. Fine and more easily carbonized feed stock, such as sawdust and shavings, is fed into the bed by, for example, a screw feeder. The entry points 18, 19, for these residues, should be below the bed to eliminate the carry over of the fine material in the gas stream, which would otherwise result in bypassing of the bed.

The heat exchange system described with reference to FIG. 1 is based upon heat transfer oil circulation as an efficient means of extracting heat from the bed. The bed's temperature of around 500° C. is well suited to heat transfer oil which should give a long service life since a suitable wall temperature inside the heat transfer tubes can be more easily achieved.

The ilmenite sand in the fluidized bed 12 acts as an inert medium for enabling a fluidization of the range of wood residue particle sizes. The sand is also a reservoir for heat transfer in removing heat from the combustion gases and it heats the feedstock particles to effect drying of the wood residues and raises their temperature to that required for carbonization. It also provides heat to the heat exchanger. The sand circulation from the inlet to the outlet of the fluidized bed conveys the feedstock through its various stages of heating and thermal decomposition. The circulation rate therefore controls the extent of the decomposition process to some degree. Circulation rate can be controlled by the rate of discharge of bed material onto the screen for a given volume of sand in the system and the rate of return of sand into the bed 12. An adjustable height weir and/or a valve arrangement can regulate this flow at the outlet. Sand make up may be required as sand is lost through carry over into the cyclone and with the coarse product. Low superficial velocities and efficient screening act to minimize sand loss.

The present invention provides a very flexible method and apparatus for producing charcoal by carbonization of wood residues. The use of multiple entry feed points for the wood residues allows a wide variety of different residues to be carbonized in a single reactor unit without the necessity of designing separate units for the different grades of wood residues. The fluidized bed carbonization with heat recovery described in the preferred embodiment of the present invention integrates well with sawmilling and kiln drying operations since it has the potential of processing the total wood residue production and to produce heat for kiln drying. Excess energy in the residues is converted into a charcoal product which can be more economically transported to markets since the mass is reduced to a small fraction of the original and the value of the charcoal product is significantly increased. The fluidized bed system described herewith also has the flexibility of being able to operate as a straight combustor where all the fuel feedstock is burnt to produce heat. This is particularly useful in situations such as the startup of timber drying kilns where the heat demand from the cold kiln is at its maximum. During mid-cycle heating, where demand for heat falls, charcoal production can resume on a scale dictated by demand.

Referring to FIG. 2, this shows a schematic side elevation, partly in cross-section, of an apparatus, in accordance with the present invention. It will be appreciated that the apparatus shown in FIG. 2 is intended to be illustrative of one aspect of the present invention and that the invention is not to be limited to the illustrated embodiment.

The apparatus 110 shown in FIG. 2 includes a reactor 111 positioned inside a furnace 112. The furnace 112 is supported by support legs 113, 114. The furnace 112 has external walls that are insulated by insulating layer 115. The insulating layer is conventional and may comprise any suitable furnace insulation known to those skilled in the art. The furnace 112 includes burner 116 which is positioned for tangential entry. The furnace also includes a second tangential entry burner positioned 180° apart from burner 116, but not shown in FIG. 2. The furnace has an exhaust gas outlet 117 for removing exhaust gas from the furnace. The exhaust gas outlet 117 is connected to an exhaust gas conduit 118.

Reactor 111 is positioned within furnace 112. The reactor 111 includes a solids inlet 122 through which solids may be admitted to the reactor. The solids inlet 122 is connected to a hopper 123 by solids conduit 124. Hopper 123 may include a valve (not shown) to control the flow of solids to the reactor.

The reactor also includes a plurality of gas inlet means, only one of which is shown at reference numeral 125. The gas inlet means comprises a plurality of ports formed in the lower part of the reactor 111. The plurality of ports extends in a line substantially around the circumference of the reactor 111. Gas pipe 126 has one end connected to gas inlet port 125 and the other end connected to gas manifold 127. Gas manifold 127 extends substantially around the upper part of the reactor. The gas manifold 127 has a plurality of outlets that are connected by respective ones of the plurality of gas pipes to respective gas inlet ports. The gas manifold 127 includes an inlet 128 through which gas is admitted to the manifold.

The reactor 111 shown in FIG. 2 is configured as a fluidised bed reactor and it includes a bottom portion 138 of reduced diameter and an upper portion 129 of increased diameter. Solids are loaded into the bottom portion 128 and fluidised by the fluidising gas entering the reactor through the plurality of gas inlet port 125.

The reactor further includes an exhaust gas outlet 130 connected to an exhaust gas conduit 131. Exhaust gas must flow through cyclone 132 (shown in dotted outline) prior to leaving the exhaust gas outlet 130. The cyclone 132 acts to reduce the amount of solid material entrained in the exhaust gas leaving the reactor 111. Solid particles removed from the exhaust gas by cyclone 132 are returned to the reactor. This acts to reduce the amount of solids material elutriated by the exhaust gas leaving the reactor. The exhaust gas may be processed by further gas cleaning equipment (not shown) such as a baghouse or an electrostatic precipitator, in order to remove any elutriated fines therefrom.

The lower end of the reactor includes a solids outlet 133. The solids outlet 133 includes a solids control flow valve 134. A conduit 135 connects the solids outlet 133 to a receiving hopper 136.

Operation of the apparatus shown in FIG. 2 will now be described. In the following description, the apparatus shown in FIG. 2 is used in a batch process for the production of activated carbon from a charcoal feedstock. Although the following description will describe a batch process, it will be appreciated that the process could equally be operated as a continuous process.

In the batch process for the production of activated carbon from charcoal feedstock, the solids to be charged to the reactor are fed into hopper 123 and subsequently discharged from hopper 123 via solids conduit 24 through solids inlet 122 into the reactor 111. Solids charged to the reactor 111 suitably comprise a mixture of calcined alumina and charcoal. The feedstocks used in experiments to date have included calcined wood pellets, sawdust charcoal and coconut shell charcoal. The calcined wood carbon pellets were pellets 1.6 mm in diameter passing a 3 mm aperture screen. The sawdust charcoal had the following size analysis:

A size analysis of the coconut shell charcoal was not conducted. Calcined alumina of the following size analysis was also added:

| | |
|---|---|
| +212 microns | less than 1% |
| −212 + 106 microns | 40–60% |
| −106 + 45 microns | 53–60% |
| −45 microns | 0–5% |

Burner 116 is ignited in order to cause an increase in the temperature inside the furnace, which will thereby elevate the temperature of the reactor and the contents of the reactor. Steam is supplied via a steam line (not shown) to the gas inlet 128 of the manifold 127. The steam flows into the manifold 127 and subsequently through the gas outlet in the manifold in through pipes 126 and into gas inlet port 125 of the reactor. As the steam flows through the manifold 27 and the plurality of gas pipes 126, both of which are positioned external to the reactor and within the furnace, the steam is superheated by the furnace to the desired temperature, for example, to a temperature within the range of 650–1000° C., more preferably to a temperature within the range of 800–850° C.

The superheated steam fluidises the solids in the reactor and the combination of steam and elevated temperature causes activation of the charcoal in the fluidised bed to produce activated carbon.

The exhaust gas leaving the reactor via cyclone 132 and gas outlet 130 includes water gas. The exhaust gas passes through conduit 131 to a water gas recovery unit where any water vapour is condensed therefrom. The gas is then recovered for distribution to parts of the plant that require a fuel gas. A portion of the water gas is advantageously supplied as a feed gas to burner 116 to thereby provide for the energy requirements of the furnace. Excess water gas may be fed to other parts of the site as a fuel gas or alternatively may be fed to a gas turbine to generate electricity for use on site or for sale to the electricity grid.

Once the batch process has been operated for sufficient time to convert substantially all of the charcoal feedstock to activate a carbon, solids valve 134 is opened and the solids content of the reactor 111 fall through solids outlet 133 and solids conduit 135 into hopper 136. After allowing a suitable time for the solids to cool to an appropriate temperature (which time may be reduced by the use of a coolant) the solids in hopper 136 are sieved to separate the calcined alumina from the activated charcoal. The activated charcoal is a product and is recovered whilst the calcined alumina is fed to the next batch.

If a coolant is used to cool the solids recovered from the reactor 111 at the end of a batch, the coolant is suitably water and the waste heat extracted from the solids by the water is preferably used to generate steam for feeding to the gas manifold 127. Alternatively, the hot charge can be sieved directly through a screen located below solids valve 134 to separate the coarse activated carbon from the fine, calcined alumina. The alumina is then returned to the reactor via

| | −6.83 mm +6.83 mm | −3.35 mm +3.35 mm | 2.36 mm +2.36 mm | −1.7 mm +1.7 mm | −1.4 mm +1.4 mm | −1.18 mm +1.18 mm | −1.0 mm +1.0 mm | −0.85 mm +0.85 mm | −0.6 mm +0.6 mm | +0.3 mm | −0.3 mm |
|---|---|---|---|---|---|---|---|---|---|---|---|
| | 0% | 1.3% | 3.1% | 8.0% | 8.2% | 8.7% | 10.5% | 6.9% | 12.0% | 32.3% | 8.9% | hopper 123 and solids conduit 124. Feedstock carbon is then charged via hopper 123 and solids conduit 124 for the next batch activation cycle.

In order to ensure a continuity of supply of water gas for the process, it is preferred that the apparatus shown in FIG. 2 comprises one of a plurality of similar apparatus. For example, the apparatus shown in FIG. 2 may comprise one of five similar apparatus operated in batch mode to produce activated carbon from charcoal.

The apparatus shown in FIG. 2 and the process for producing activated carbon described herein may suitably form part of an integrated wood treatment plant, such as a sawmill or a woodchipping mill. In such an integrated plant, sawn logs are processed to produce lumber products such as sawn timber or wood chips. The wood residues and wood wastes remaining from that process such as sawdust, bark, thinnings and wood chips may be processed in an associated wood carbonisation plant (for example, as is described in the applicant's Australian Patent No. 547130) in order to produce charcoal. The charcoal may then be fed to the apparatus shown in FIG. 2 for conversion into activated carbon. The activated carbon is a value added product produced from what would otherwise be a waste stream from the plant.

The activated carbon that is produced by the process of the present invention may be either granulated activated carbon or pelletised activated carbon. Granulated activated carbon may be made by activating charcoal feedstock of suitable size. Activated carbon pellets are preferably produced by manufacturing pellets of the charcoal feedstock and subsequently activating those pellets.

Those skilled in the art will appreciate that the invention described herein may be subject to variations and modifications other than those specifically described. It is to be appreciated that the present invention encompasses all such variations and modifications that fall within its spirit and scope.

The invention claimed is:

1. A process for the production of activated carbon from a carbonized feedstock, comprising the steps of:
   providing a fluidized bed reactor;
   adding particulate material to the fluidized bed reactor to form a bed of particulate material in said fluidized bed reactor;
   adding carbonized feedstock to the fluidized bed reactor;
   further fluidizing the fluidized bed reactor; and
   adding superheated steam to the fluidized bed reactor to activate the carbon in the carbonized feedstock
   to produce activated carbon.

2. The process of claim 1, wherein said carbonized feedstock is the product of a process for carbonizing wood residues to produce charcoal, said wood residues including wood or woody-type particles of varying size and/or moisture content, the process including the steps of feeding the wood residue to a fluidized bed having a plurality of wood residue inlets, the wood or woody-type particles of varying size and/or dryness being fed to differing ones of the plurality of wood residue inlets according to an expected time for carbonization for said wood or woody-type particles, the fluidized bed including a bed of inert particulate material fluidized with or having injected therein a gas or gas mixture containing an oxidizing gas, carbonizing the wood residues in the fluidized bed under reaction conditions selected such that volatile components in the wood residues are removed during carbonization and are burned in or above the bed or in an afterburner to thereby supply the heat requirements for carbonization and separating charcoal from the inert particulate material.

3. A process of claim 1, further comprising the step of recovering the activated carbon from the fluidized reactor bed.

* * * * *